Figure 1:
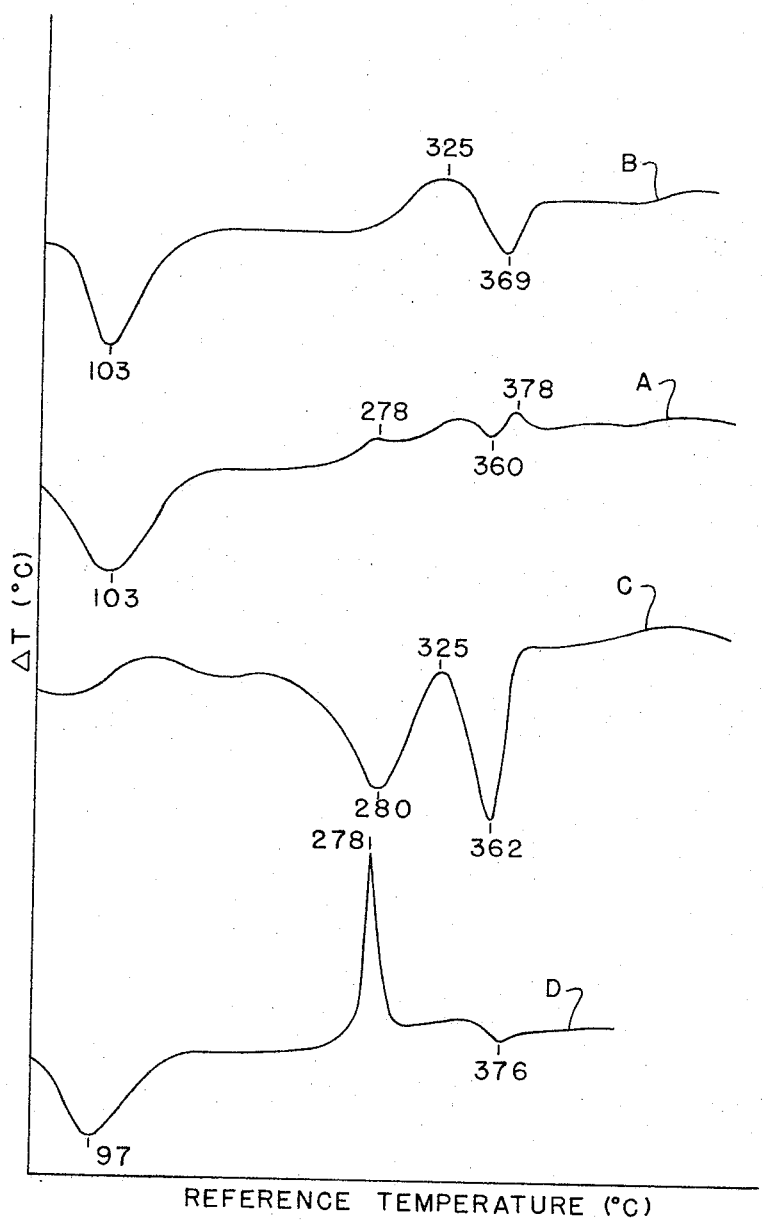

DTA OF ALKALI CELLULOSE - ACRYLONITRILE PRODUCT

United States Patent Office 3,312,642
Patented Apr. 4, 1967

3,312,642
GRAFT POLYMERIZATION ON CELLULOSE BY REACTION OF ALKALI CELLULOSE AND VINYL MONOMERS
Robert F. Schwenker, Jr., and Eugene Pacsu, Princeton, N.J., assignors to Kimberly-Clark Corporation, Neenah, Wis., a corporation of Delaware
Filed July 12, 1963, Ser. No. 294,613
3 Claims. (Cl. 260—17.4)

This invention relates to the preparation of ethers of cellulose by reaction of alkali cellulose with ethylenically unsaturated etherifying agents and is particularly concerned with the formation of graft copolymers of cellulose and vinyl compounds.

A primary object of the present invention is to provide a process in which alkali cellulose is utilized as an intermediate to prepare a graft copolymer of cellulose and vinyl monomers and in which process competing reactions tending to form undesirable by-products are minimized.

It is an important object of the invention to provide a novel cellulose ether product.

Alkali cellulose is a term applied to cellulose which has been treated with strong alkali solutions at low or normal temperatures; the alkali commonly employed in alkali cellulose preparation is sodium hydroxide. Alkali retention is probably the result of both intimate physical admixture and some chemical combination with the cellulose. In any event, the extent to which the alkali is taken on by the cellulose may vary widely; in usual practice the cellulose is soaked in a predetermined concentration of the alkali solution and then drained or pressed to remove excess to achieve a desired amount of alkali in combination with the cellulose.

Alkaline catalysts are employed in the cyanoethylation of cotton and other types of cellulose by reaction with acrylonitrile. The alkali solution employed in such treatment is normally low in concentration, frequently 1–2%. Additionally, the weight pickup of the alkali upon pressing is customarily relatively low. While the extent of cyanoethylation in the low ranges of alkali concentration tends to increase with alkali concentration, highly caustic solutions have been found to induce loss of acrylonitrile through side reactions and to result in loss of quality in the cyanoethylated product. Thus, it has been found in one treating procedure that a caustic concentration of 10% is suitable at a temperature of 35° C. of the caustic solution but that, at higher temperatures, a corresponding reduction in caustic concentration is employed. Maximum cyanoethylation of cellulose, in substantially aqueous systems at about 15–20° C., tends to occur at about a 13% sodium hydroxide concentration, a figure which is related to the maximum swelling zone of cellulose. Above about this concentration nitrogen content in the product falls off.

This cyanoethylation reaction is materially affected by the tendency of the reactants to engage in side reactions and to produce unwanted by-products. This tendency is affected by the presence of water in the alkali cellulose, the water reacting with acrylonitrile to produce $\beta,\beta'$-oxydipropionitrile; even at very low alkali concentrations of 1 to 2% this reaction tends to occur and to increase with reaction time. Additionally, at high alkali concentrations, above about 10% caustic, hydrolysis tends to occur, resulting in carboxyethylation with corresponding loss of nitrogen in the product.

In accordance with the present invention, it has been found that, when an alkali cellulose is reacted under controlled conditions with certain vinyl monomers in their undiluted form, there is produced a product which is indicated by differential thermal analysis, acid and alkaline insolubility, chemical analysis, and by net weight increase after vigorous solvent extraction to remove homopolymer, to be essentially a graft copolymer. The said certain monomers must be anionically polymerizable. Such ethylenically unsaturated monomer, one of which is acrylonitrile, is preferably employed in excess to treat the alkali cellulose, and unreacted monomer is later eliminated by a simple extraction.

An essential condition of the reaction of the invention is that the alkali cellulose have a high molal ratio of alkali to celluose—at least one mole of alkali per mole of cellulose (anhydro-glucose unit) and preferably not more than about 1.8 moles of alkali per anhydro-glucose unit of cellulose. Above about the latter degree of alkalinity the nitrogen content and the weight gain of the cellulose substrate involved in the reaction tend to decrease. Accordingly, while the reaction takes place when the noted ratio is as high as 3.3:1, such high degree of alkalinity is not necessary. To achieve the desired degree of alkali in the cellulose, the solution concentration at about 20° C. is suitably between 20 and 40% alkali and the weight pickup of the cellulose after pressing is 100% or more.

Additionally, the reaction between the alkali cellulose and the liquid monomer is effected with the monomer in contact with an inert atmosphere and the alkali cellulose immersed in the monomer. The reaction temperature and the reaction time may vary widely and are influenced to some degree by the particular etherifying component and the amount of alkali present in the alkali cellulose. In general, graft copolymer formation is favored at times of from a fraction of an hour up to about 4 hours at moderate reaction temperatures.

The invention will be particularly described with reference to sodium as the alkali metal, as such is technically and economically convenient; potassium and lithium may be employed as the alkali metals and, while the metals vary slightly in reactivity, this is not a critical factor in the alkali cellulose reactivity.

Acrylonitrile is typical of the useful monomers. At temperatures of between about 25° C. and 78° C. and for reaction times of from 15 minutes to a plurality of hours, nitrogen containing derivatives having little homopolymer or cyanoethylation are produced. The differential thermal analysis data, the weight increase of the substrate, the nitrogen content and solubility criteria are important product characterizing factors. For a given alkali cellulose substrate, the weight gain increases with reaction time within limits; further, a significant weight increase is exhibited after rigorous extraction procedures including product extraction with a homopolymer solvent such as hot dimethylformamide.

Figure 2:
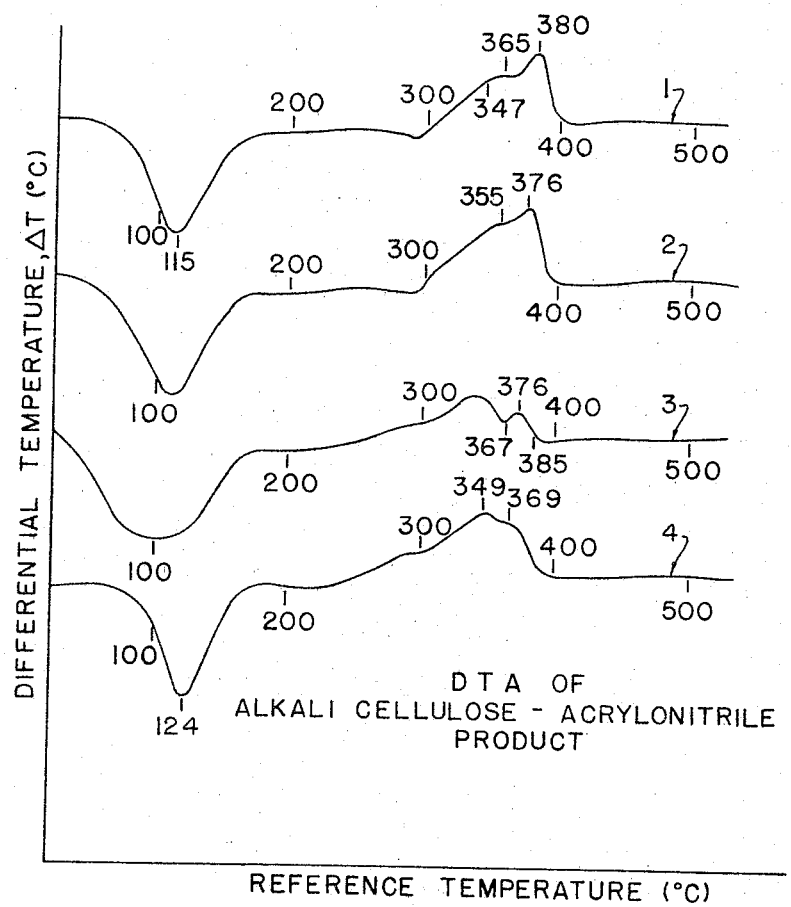
Figure 3:
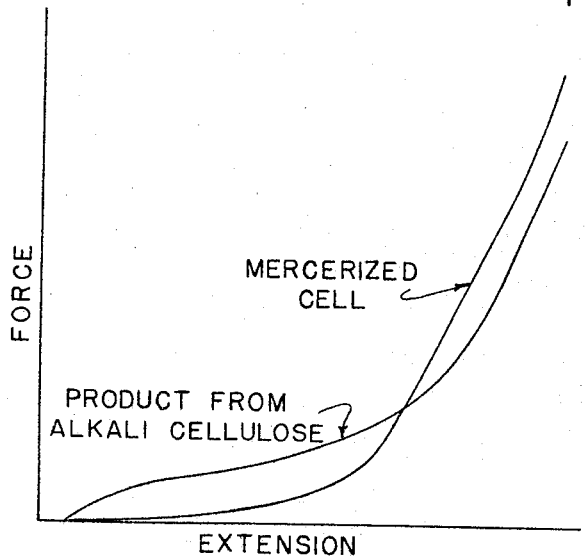

The invention will be more fully understood by reference to the following detailed examples, the accompanying tables, and the differential thermal analysis curves in the drawings wherein:

FIG. 1 is a graph comparison of one cellulose-acrylonitrile embodiment in accordance with the invention with other cellulose-arylonitrile products;

FIG. 2 is a graph of cellulose-acrylonitrile products in accordance with the invention illustrating the effect of the concentration of moles of alkali per mole of cellulose on the reaction. The curves of the graphs are more completely described in connection with the detailed examples which follow; and FIG. 3 is a graph illustrating mechanical properties of the alkali cellulose-acrylonitrile product on a comparative basis with mercerized cellulose.

*Example 1*

Initially, a sample of about 1 gram of an 80 x 80 cotton print cloth fabric (3.5 oz. per square yard) is immersed in a 20% sodium hydroxide solution for 30 minutes at room temperature (about 70° F.) to swell the cotton and facilitate subsequent reactions. The sample after removal from the solution is pressed between glass plates to about two times the original sample weight, providing about 100% pickup.

The amount of sodium hydroxide present is determined by acidimetry. In the instance specifically described, the molal ratio of alkali to celluose is about 1.4:1.

The alkali cellulose sample is reacted with acrylonitrile by heating the fabric in the monomer (100%) under nitrogen at 78° C. for 45 minutes. Purified nitrogen dried by passage through a silica gel column is bubbled through the monomer to provide the nitrogen atmosphere. During the reaction the alkali cellulose sample remained white for a time in excess of 15 minutes and developed a yellow coloration with orange spots or flecks throughout as reaction time increased. This product, upon removal from the reaction vessel and the nitrogen atmosphere, is extracted with acetone to remove excess monomer.

The acetone extraction is followed by an extraction with methyl alcohol and then a washing with acetic acid and water. This extraction and wash removes substantially all of the ionic (sodium) constituent from the reaction product. The washing steps with water or with dilute acid or with both acid and water are considered to be important to effect removal of alkali which might otherwise be retained within fibers of the sample.

The resultant sample weight after this extraction is considerably in excess of the original sample weight—about 19-2%, or substantially an increase of ⅕. The nitrogen content of the so-extracted sample is about 4.2%.

Extraction of the sampe with hot dimethylformamide follows the acetone, alcohol, and water extractions. Such is effective to remove polyacrylonitrile present. The weight increase of the sample after dimethylformamide extraction and a water wash is about 14% and the nitrogen content is about 2.6%.

As the time of reaction for a sample having a given quantity of alkali (sodium) in the sample increases, the weight increase of the sample rises sharply. Thus, at a reaction temperature of 78° C. the weight increase after extraction with methyl alcohol dilute acetic acid (2%) and water is about 7.7%, 15.9% and 30.3% at reaction times of 15, 30 and 45 minutes, the sample in each instance having an apparent $DS_{Na}$ of 1.3 or a molal ratio of alkali to cellulose of 1.3. Increase of the molal ratio of alkali to cellulose beyond about 1.8, as will be illustrated by examples following hereinafter, tends to decrease the level of the reaction, resulting in lowered nitrogen contents and weight increases.

Referring to the accompanying drawing (FIG. 1), curve A characterizes properties of the acrylonitrile-alkali cellulose reaction product, the other curves presenting comparative information, all based on differential thermal analysis. The data for the curves are obtained by heating a sample in nitrogen at a constant rate of heat input through a temperature range of interest. The temperature of the sample and a thermally stable reference substance are continuously measured and the differential temperature is plotted against the sample—material temperature; deflections from the steady state give rise to endothermic (curve downturns) and exothermic (curve upturns) peaks. Such procedure as here employed is described in reviews by Murphy (Murphy, C. B., Modern Plastics, 37, 125, 1960, and Murphy, C. B., Analytical Chemistry, 34, 298R, 1962, Analytical Reviews).

The data for curve A is obtained from an alkali cellulose-acrylonitrile reaction product in which the weight gain was about 7.3%, the reaction having been carried for 15 minutes at 78° C. and in accordance with the complete extraction procedure, including dimethylformamide described hereinbefore. As will be noted, curve A displays a small exotherm at about 378° C. This exotherm is of greater intensity for products having a greater weight gain. The control sample, upon which curb B is predicated, is pretreated with 20% sodium hydroxide to effect swelling of the cellulose, the sodium hydroxide is washed out, the sample neutralized and then treated with acrylonitrile and extracted in the same manner as the sample for curve A.

However, as will be noted from the drawing, the control sample of curve B, the cyanoethylated cotton sample of curve C, and the cotton-polyacrylonitrile mixture of curve D all exhibited an opposite action, an endothermic action in the temperature range of about 350° C. to 380° C., although the endotherm is slight in the instance of curve D.

Referring to curve D, the sharp exothermic reaction at about 278° C. is indicative of polyacrylonitrile homopolymer; such is materially suppressed in curve A.

The following examples taken with Table 1 and FIG. 2 indicate the effect of increasing alkalinity on the graft copolymer. In the table the data of Examples 1–5 inclusive are tabulated and compared with a control sample (see curve B of FIG. 1) and a sample of cyanoethylated cotton (see curve C of FIG. 1). The tabulation is:

TABLE I.—ALKALI CELLULOSE-AN PRODUCT DATA
[Reaction at 45 minutes at 78° C.]

| Sample | Wt. Inc. (Percent) | Nitrogen [1] | Moles Na/ Mole Cell | CED Soly [2] (Percent) |
|---|---|---|---|---|
| Control | 0 | 0 | 0 | 90 |
| Cyanoethyl. cotton | 29.0 | 4.60 | 0 | 84 |
| Ex. 1 | 14 | 2.6 | 1.4 | |
| Ex. 2 | 24.2 | 3.28 | 1.8 | 8 |
| Ex. 3 | 21.0 | 3.05 | 1.7 | 5 |
| Ex. 4 | 16.5 | 2.72 | 2.8 | 1 |
| Ex. 5 | 18.7 | 2.8 | 3.3 | 1 |

[1] Kjeldahl determination.
[2] 100 mg./100 cc. 0.5 M CED (cupriethylenediamine) for 60 minutes at 25° C. Residues washed in 1:1 HCl-H₂O, vacuum dried, and weighed.

*Example 2*

A substrate consisting of about 3 grams of cotton print cloth (3.5 oz. per square yard) was immersed in a 20% by weight aqueous sodium hydroxide solution for 30 minutes at about 70° F. Upon removal, the substrate was drained and passed between rubber squeeze rolls to remove excess alkali. The weight pickup was 100%. This alkali cellulose contained about 1.8 moles of sodium hydroxide per mole of cellulose. The substrate was then reacted with a 100% acrylonitrile monomer at 78° C. for 45 minutes under dry purified nitrogen as described in connection with Example 1. During the reaction with the acrylonitrile, the substrate first became pale yellow and then deep yellow-orange in color. At the termination of the reaction period excess monomer was drained from the substrate, and the product was extracted as in Example 1 with (1) acetone, (2) methanol, (3) dilute acetic acid, (4) water, and (5) dimethylformamide at 80° C. for 2 periods of 2 hours each.

This substrate exhibited a weight increase after the noted extraction of about 24.2% and a nitrogen content (Kjeldahl) of about 3.28%. Curve 1 of FIG. 2 illustrates the differential thermal analysis characteristics of this product. Additionally, the product was essentially insoluble in cupriethylenediamine (CED). This was determined by stirring 100 milligrams of the described product into 100 cc. of 0.5 molal cupriethylenediamine and stirring for 60 minutes at 25° C. after which the resultant mixture was filtered. The amount of insoluble residue was recovered, washed in a 1:1 by weight solution of hydrochloric acid and water, vacuum dried, and weighed. The weight was found to be 92 milligrams indicating that the product is only about 8% soluble under the conditions of the test. It is to be noted that under the same conditions cotton fabric is about 90% soluble. The product of the above-noted reaction was also found to be insoluble in 62% sulfuric acid after stirring for 60 minutes in 100 cc. of acid at 25° C. Under the same conditions the untreated cotton fabric is substantially completely soluble.

*Example 3*

Using the same fabric reacted and under the same conditions as in Example 2, the substrate contained about 1.7 moles of alkali per glucose anhydride unit of cellulose and after copolymerization and extraction exhibited a weight increase of 21%, a nitrogen content of 3.05%, about 5% solubility in 0.5 molal cupriethylenediamine and essential insolubility in 62% sulfuric acid. Curve 2 of FIG. 2 illustrates the differential thermal analysis characteristics which are very similar to those of curve 1, FIG. 2.

*Example 4*

A substrate of cotton print cloth (3½ oz. per square yard) weighing about 3 grams was immersed in 40% sodium hydroxide for 30 minutes at room temperature (about 70° F.) which caused material swelling of the substrate. Upon removal from the alkali, the solution was pressed through squeeze rolls and then exhibited a weight pickup of alkali of 100%. The treated cloth was found to have about 2.8 moles of sodium hydroxide per glucose anhydride unit. This substrate was then reacted with 100% acrylonitrile monomer under nitrogen for about 45 minutes at 78° C. During the reaction the product became yellow-orange in color. This substrate, after removal from the reaction vessel, was extracted under the same conditions set forth in the previous example. The weight increase of the substrate was 16.5% and the nitrogen content 2.72%. The solubility in CED was 1% and it was essentially insoluble in sulfuric acid. Accordingly, the substrate is essentially insoluble in the noted materials. Curve 3 of FIG. 2 illustrates the differential thermal analysis characteristic of this product.

*Example 5*

Another and similar substrate of the cotton print cloth was treated in a similar solution of sodium hydroxide under the same conditions and for the same length of time as in Example 4 and exhibited, after passage through the squeeze rolls, a pickup of 100% and a content of 3.3 moles of sodium hydroxide per glucose anhydride unit. After the reaction in the acrylonitrile monomer under the same conditions previously noted in this example, the product became again yellow-orange in color and was extracted in the manner already recited. The weight increase was found to be about 18.7%, the nitrogen content 2.80%, and there was the same essential insolubility in cupriethylenediamine and sulfuric acid. Curve 4 of FIG. 2 illustrates the differential thermal analysis characteristics of this product.

*Example 6*

A 1.2 gram substrate of bleached saturation grade cellulosic paper was immersed in 20% sodium hydroxide solution for 30 minutes at room temperature (about 70° F.). Upon removal from the alkali, the substrate was passed through squeeze rolls and the resultant material was found to have a content of 1.7 moles of sodium per mole of cellulose. The substrate was immediately wet out with acrylonitrile monomer at room temperature (70° F.) and then transferred to a 100% acrylonitrile monomer solution at 78° C. in a nitrogen atmosphere. The reaction was permitted to occur for a period of about 45 minutes. During the reaction the light saturation grade paper turned orange. The product was extracted in acetone followed by an extraction with dilute acetic acid (4%) and then water. Finally the product was extracted with dimethyl formamide at 95° C. for about one hour. The weight increase of the substrate was about 23% and the nitrogen content was 2.79%. The solubility of the product at 0.5 molal CED was about 4.9%. It should be noted that the paper substrate is somewhat more fragile under reaction conditions than cotton cloth and it is preferred to support the substrate throughout the reaction conditions to avoid disintegration.

*Example 7*

A 3-gram substrate of an 80 x 80 cotton print cloth (3½ oz. per square yard) was immersed in 20% sodium hydroxide at room temperature, thereafter passed through squeeze rolls, and then exhibited an alkali pickup of about 100%. The substrate contained 1.5 moles of sodium hydroxide per mole of cotton cellulose. This substrate, when treated in 100% methyl acrylate monomer at 75° C. under purified nitrogen for 45 minutes, did not change color but became quite stiff. The treating solution contained .002% hydroquinone. The product was then extracted successively with acetone, methanol and water and it became soft and pliable. A final extraction of this soft pliable product was made with 4% acetic acid followed by further washing with water. The weight increase after vacuum drying at 50° C. was 5.0%.

The differential thermal analysis curves for the products described in Examples 2 through 5 and shown in FIG. 2 may be compared with the curves of FIG. 1. The specific conditions under which the analysis curves were made were as follows: a heating rate of 10° C. per minute with a sample size of 200 milligrams in an atmosphere of nitrogen employing aluminum oxide as the reference. Comparison with the differential thermal analysis curves of the untreated cotton curve B and cyanoethylated cotton curve C in FIG. 1 indicates (1) that a chemical reaction has occurred between acrylonitrile and cellulose, and (2) that cyanoethylation did not occur to any significant degree. These curves show evidence for at least two and possibly three reactions. For the higher nitrogen content derivatives, curves 1 and 2, after a large endotherm for moisture desorption, the first reaction is exothermic and starts around 290° C. There is a gradual exothermic rise until around 360° C. at which point the reaction either stops or an endothermic process interrupts to result in the shoulder or dip observed around that temperature. Since unmodified cellulose shows a large endotherm in this region, due to depolymerization, it seems reasonable to assume that an endothermic process, involving the unmodified portion of cellulose, may occur. This is immediately followed by another exothermic reaction with a peak at ca. 380° C. In the case of the lower nitrogen content products, curves 3 and 4 (FIG. 2), the exothermic processes appear to start earlier and the endothermic process around 365° C. is more pronounced followed by a smaller exotherm. These products also show generally reduced peak heights as would be expected from the lower nitrogen contents found.

Thus, it is believed that at least three seperate reactions occur as indicated by the differential thermal analysis. One, an exothermic process, probably involves intra and/ or interchain reactions of the polyacrylonitrile component. In some derivatives an earlier exothermic reaction is suggested with a peak in the range of 270° C. to 300° C. which is believed to be the reseult of small amounts of homopolymer, producing the exothermic reaction previously shown to occur in unadulterated polyacrylonitrile in that temperature range. The second major reaction, an endothermic process, is due to the depolymerization of the unmodified cellulose component via thermal scission of the 1,4 glucosidic links in the cellulose chains. The nature of the third reaction, an exothermic process, probably involves the formation of new products from the fragmentation products of cellulose and polyacrylonitrile.

Among other physical characteristics of the product of the alkali cellulose-acrylonitrile reaction is the low solubility in 0.5 molal cupriethylene diamine. A product which had demonstrated a weight increase after extraction as described above of 16.4% (2.37% N) was only very slightly soluble (1.5%) after 60 minutes immersion. A product having a weight increase of 21.8% (2.88% N) indicated zero solubility under the same conditions. It is to be noted that, while the products described hereinbefore are essentially insoluble, they differ from products treated by the ceric ion technique in grafting processes. The latter emerge from treatment in cupriethylene diamine as dark chunks or pieces while the products of this invention appears as a gelatinous mass. Also, the product of this invention differs materially from the product of our copending application Ser. No. 236,280 filed Nov. 8, 1962 and assigned to the same assignee as the present invention in that the latter product exhibits high solubility in cupriethylene diamine.

In FIG. 3 typical force extension curves of cotton print cloth treated in accordance with the invention as previously described and the same cloth in the mercerized condition are shown. In the low force regions the cellulose acrylonitrile product illustrated by curve 10 shows significant differences from the mercerized or regenerated cellulose product indicated by cure 12. In the case of the alkali cellulose-acrylonitrile product, an early yield is indicated followed by substantial extension before the force again increases materially.

In addition to acrylonitrile, acrylamide, methacrylonitrile, methyl acrylate, methyl methacrylate or styrene may be employed as the ethylenically unsaturated monomer. Data for reaction of other vinyl esters with alkali cellulose in the manner previously described follow:

TABLE II.—ALKALI CELLULOSE-VINYL MONOMER PRODUCTS

| Monomer | Reaction t (min.) | Wt. Inc. (Percent) |
| --- | --- | --- |
| Vinyl acetate | 15 | 11.5 |
|  | 45 | 13.3 |
| Vinyl butyrate | 15 | 4.8 |
|  | 45 | 7.5 |
| Methyl Methacrylate | 45 | 4.1 |

It is considered that the reaction is essentially an addition across the vinyl bond in a base catalyzed Michael condensation, followed by further polymerization by an aniontic mechanism.

While the invention has been described essentially in connection wih cotton fabric as a substrate, the procedure is applicable to yarns, bleached and unbleached pulp, viscose rayon, and the like. The product in its graft form has a capacity for fold endurance, abrasion resistance, and the like.

It will be understood that this invention is susceptible to modification in order to adapt to different usages and conditions and, accordingly, it is desired to comprehend such modifications within the invention as may fall within the scope of the appended claims.

What we claim is:

1. The etherification process which comprises suspending a cellulose substrate in a 20–40% by weight aqueous alkali solution followed by pressing the substrate wet to remove excess alkali such that the substrate has a mole ratio of alkali to cellulose in the range of about 1:1 to 3.3:1 and then:
    (a) immersing the alkali cellulose substrate having a molal ratio of alkali to cellulose in the range of about 1:1 to about 3.3:1 in an excess of a liquid etherifying agent in an inert atmosphere and which agent is an ethylenically unsaturated monomer which may itself be anionically polymerized;
    (b) reacting the alkali cellulose substrate and monomer at a temperature of between about 25° C. and 78° C. to form a cellulose-etherifying agent copolymer;
    (c) removing the reacted substrate copolymer from the monomer excess; and
    (d) recovering the copolymer reaction product by extracting the substrate with suitable solvents.

2. The etherification process which comprises suspending a cellulose substrate in a 20–40% by weight aqueous alkali solution followed by pressing the substrate wet to remove excess alkali such that the substrate has a mole ratio of alkali to cellulose in the range of about 1:1 to 3.3:1 and then:
    (a) immersing the alkali cellulose substrate having a molal ratio of alkali to cellulose in the range of about 1:1 to about 1.8:1 in an excess of acrylonitrile monomer in contact with an inert atmosphere;
    (b) reacting the alkali cellulose substrate and acrylonitrile at a temperature of between about 25° C. and 78° C. to form a cellulose-acrylonitrile copolymer;
    (c) removing the reacted substrate copolymer from the monomer excess; and
    (d) recovering the cellulose-acrylonitrile substrate by extracting the substrate to remove monomer, alkali and polyacrylonitrile.

3. The process which comprises suspending a cellulose substrate in a 20–40% by weight aqueous alkali solution followed by pressing the wet substrate to remove excess alkali such that the substrate has a mole ratio of alkali to cellulose in the range of about 1:1 to 3.3:1 and then:
    (a) immersing the alkali cellulose substrate having a molal ratio of alkali to cellulose of 1.3 to about 1.8 in an excess of acrylonitrile monomer which is in an inert atmosphere;
    (b) reacting the alkali cellulose substrate and acrylonitrile at a temperature of between about 25° C. and 78° C. for time periods of between about 15 and 45 minutes to develop a copolymer substrate which exhibits a substantial weight increase;
    (c) removing the reacted substrate from the monomer excess; and
    (d) recovering the substrate copolymer by extracting the substrate to remove monomer, alkali, and homopolymer, said substrate being characterized by a differential thermal analysis curve which has a prominent exotherm in the range of 350° C. to 380° C.

References Cited by the Examiner

UNITED STATES PATENTS 2,994,634  8/1961  Jayne _____ 169—138
3,067,141  12/1962  Bikales _____ 260—17.4

FOREIGN PATENTS

37/3,300  1/1962  Japan.

LEON J. BERCOVITZ, *Primary Examiner.*

R. W. MULCAHY, *Assistant Examiner.*